United States Patent
Kobori et al.

(10) Patent No.: US 10,187,620 B2
(45) Date of Patent: Jan. 22, 2019

(54) DISPLAY DEVICE

(71) Applicant: MAXELL, LTD., Kyoto (JP)

(72) Inventors: Tomoki Kobori, Tokyo (JP); Yoshiho Seo, Tokyo (JP); Yuya Ogi, Tokyo (JP); Satoshi Oouchi, Tokyo (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 14/896,848

(22) PCT Filed: Sep. 24, 2013

(86) PCT No.: PCT/JP2013/075617
§ 371 (c)(1),
(2) Date: Dec. 8, 2015

(87) PCT Pub. No.: WO2015/044995
PCT Pub. Date: Apr. 2, 2015

(65) Prior Publication Data
US 2016/0255316 A1 Sep. 1, 2016

(51) Int. Cl.
*H04N 9/31* (2006.01)
*H04N 9/28* (2006.01)
(Continued)

(52) U.S. Cl.
CPC ......... *H04N 9/3185* (2013.01); *G02B 26/101* (2013.01); *G02B 26/105* (2013.01);
(Continued)

(58) Field of Classification Search
CPC ..................................................... H04N 9/3185
(Continued)

(56) References Cited

U.S. PATENT DOCUMENTS 5,424,771 A * 6/1995 Yu ..................... H04N 9/3129
348/203
7,492,495 B2 2/2009 Ishihara et al.
(Continued)

FOREIGN PATENT DOCUMENTS

JP 2000-180779 A 6/2000
JP 2007-199251 A 8/2007
(Continued)

OTHER PUBLICATIONS

Japanese Office Action dated Sep. 27, 2016 in the Japanese Application No. 2015-538648.

*Primary Examiner* — Michael Lee
*Assistant Examiner* — Justin B Sanders
(74) *Attorney, Agent, or Firm* — Volpe and Koenig, P.C.

(57) ABSTRACT

The present invention prevents image quality degradation due to pixel enlargement even when using an increased angle of inclination on projecting an image obliquely from a laser scanning display device. A swing mirror is controlled so that the scanning line density in the vertical direction of a display section is uniform in accordance with information including the angle of inclination, the distance of projection, and the display size of the display device with respect to the display section. A lens control driver is controlled so that a collecting lens has a focal point on the display section in accordance with a scanning position in the vertical direction of the swing mirror. The swing mirror or an image correction processing unit is controlled so that a display size in the horizontal direction of a display image on the display section is uniform regardless of the scanning position in the vertical direction.

12 Claims, 9 Drawing Sheets

(51) Int. Cl.
*G02B 26/10* (2006.01)
*G09G 3/02* (2006.01)

(52) U.S. Cl.
CPC ............ *G09G 3/025* (2013.01); *H04N 9/312* (2013.01); *H04N 9/317* (2013.01); *H04N 9/3108* (2013.01); *H04N 9/3135* (2013.01); *H04N 9/3161* (2013.01); *H04N 9/3164* (2013.01); *H04N 9/3188* (2013.01); *H04N 9/3194* (2013.01); *G09G 2340/0464* (2013.01)

(58) Field of Classification Search
USPC ........................................................ 348/746
See application file for complete search history.

(56) References Cited

U.S. PATENT DOCUMENTS

| | | | |
|---|---|---|---|
| 2003/0053598 A1* | 3/2003 | Sumi | B41J 2/45 378/162 |
| 2011/0128602 A1* | 6/2011 | Hamano | G02B 13/0005 359/205.1 |
| 2012/0127184 A1* | 5/2012 | Satoh | H04N 9/3129 345/530 |
| 2013/0286362 A1 | 10/2013 | Imai | |

FOREIGN PATENT DOCUMENTS

| | | |
|---|---|---|
| JP | 2011-049865 A | 3/2011 |
| JP | 2012-124880 A | 6/2012 |
| WO | 2012/111698 A1 | 7/2014 |

* cited by examiner (COMMON TO EMBODIMENTS 1-5)

(FOCUSING LENS AND BEAM FOCUS)

(FOCUSING LENS AND BEAM FOCUS)

(FOCUSING LENS AND BEAM FOCUS)

(EXAMPLE OF DRIVE WAVEFORM AND DISPLAY)

INCLINATION ANGLE: 0° (V = ±10°)

(EXAMPLE OF DRIVE WAVEFORM AND DISPLAY)

INCLINATION ANGLE: 70° (V = ±10°)

(EXAMPLE OF DRIVE WAVEFORM AND DISPLAY)

INCLINATION ANGLE: 70°(V = ±3.3°)

DISPLAY DEVICE

TECHNICAL FIELD

The present invention relates to a display device.

BACKGROUND ART

In the case of a display device displaying video by obliquely transmitting light to a screen, a method of projecting an image on which trapezoidal distortion correction is executed previously by image processing is generally used to reduce occurrence of trapezoidal distortion. For example, Patent Literature 1 discloses a method of maintaining uniformity of pixel arrangement by controlling a method of driving a uniaxial or biaxial swinging mirror and optically executing the trapezoidal distortion correction on the screen, in a display device that scans a laser beam by the swinging mirror and executes drawing.

CITATION LIST

Patent Literature

Patent Literature 1: JP-A-2007-199251

SUMMARY OF INVENTION

Technical Problem

According to Patent Literature 1, when a projective display device projects video obliquely, light is obliquely incident on the screen. For this reason, a projection pixel does not form a true circle and is enlarged in an incidence direction. For example, an enlargement factor of a beam spot on the display device of the laser scanning type in the incidence direction becomes about double at an inclination angle of 60° and becomes about triple at an inclination angle of 70°. Therefore, when priority is given to an image quality, the inclination angle at the time of the oblique projection is limited within a certain angle.

In addition, as described above, in Patent Literature 1, the trapezoidal distortion correction is performed by changing a swinging speed of the mirror for one-dimensional or two-dimensional scanning. However, because amplitude of the mirror shaft side swinging at a high speed is changed, control is necessary in a range in which the mirror can respond and the inclination angle at the time of the projection is limited within the certain angle.

Accordingly, an object of the present invention is to enable an image quality to be maintained even when video is projected obliquely and increase an inclination angle at the time of oblique projection.

Solution to Problem

The present invention has a characteristics of configurations recited in claims. Specifically, provided is a display device for emitting and scanning laser light modulated by an input video signal in a vertical direction and a horizontal direction of an image on which the video signal is based and displaying the image on a display unit, the display device including: a laser light source which generates the laser light; a light source control/drive unit which causes the laser light source to generate laser light based on the video signal; a condensing lens which condenses the laser light generated by the laser light source on the display unit; a lens control/drive unit which drives the condensing lens and adjusts a position; a swinging mirror on which the laser light passing through the condensing lens is incident and which reflects the laser light while scanning in a vertical direction and a horizontal direction of the image and emits to the display unit; a scanning position determining unit which determines a scanning position of the vertical direction and the horizontal direction of the swinging mirror; a control unit which controls an operation of the display device based on information including an inclination angle, a projection distance, and a display size with respect to the display unit of the display device; a waveform LUT for storing scanning waveforms of the vertical direction and the horizontal direction of the swinging mirror, which are calculated by the control unit based on the information; and a correction amount LUT for storing a correction amount relating to a component of the display device according to the scanning position of the swinging mirror, which are calculated by the control unit based on the information, wherein the control unit reads the scanning waveform which the waveform LUT has and controls the swinging mirror such that a scanning line density of the vertical direction of the display unit is equalized, and reads a correction amount relating to a position of the condensing lens which the correction amount LUT has and controls the lens control/drive unit such that the condensing lens has a focus on the display unit according to the scanning position of the vertical direction of the swinging mirror determined by the scanning position determining unit, according to supplied information including an inclination angle, a projection distance, and a display size with respect to the display unit of the display device.

Advantageous Effects of Invention

According to the present invention, an image quality can be maintained even when video is projected obliquely and an inclination angle at the time of oblique projection can be increased.

DESCRIPTION OF EMBODIMENTS

Embodiments of the present invention will be described using the accompanying drawings. In each diagram and each embodiment, elements having the same configurations, functions, or actions are denoted with the same numerals and overlapped explanation is omitted. In the following embodiments, numerical values are limited; however, the present invention is not limited thereto and the magnitude of an inclination angle, a swinging angle of a mirror, or resolution of an image may be arbitrarily set and may be determined by a method described in the embodiments, according to an applied device or use.

A display device according to the embodiments has display resolution of 1024×600 (1024 pixels in a horizontal direction and 600 pixels in a vertical direction) and uses a semiconductor laser emitting a light beam and easily performing light amount modulation at a high speed for a light source. Of course, an LED light source may be used together with an optical component condensing light in a beam shape or a modulation component of a light amount. In addition, a biaxial swinging mirror has swinging axes of a high speed side (hereinafter, referred to as an H axis) and a low speed side (hereinafter, referred to a V axis), with the magnitude of $\phi L=1.5$ mm; for example, the biaxial swinging mirror is driven by a drive signal Hdrive of 24.975 kHz in an H-axis direction and a drive signal Vdrive of 60 Hz in a V-axis direction, at swinging angles $\pm\theta h$ and $\pm\theta v$ (for example, $\pm 17°/\pm 10°$ at optical oscillation angles), respectively. A drive method may be any method such as electromagnetic induction, piezoelectric drive, and electrostatic drive that swings the mirror. The swinging angle is adjusted by amplitude of the drive signal in the embodiments.

Here, for the purpose of explanation, it is assumed that a spot diameter has the magnitude of $\phi 1$ mm or less and displayed video has a size satisfying desired resolution, by a general definition defining a place where radiation strength of a beam has $1/e^2$ (13.5%) of a peak value or a value on an optical axis as the spot diameter (beam diameter). In addition, it is assumed that wavelengths of beams are $\lambda r=640$ nm, $\lambda g=530$ nm, and $\lambda b=450$ nm and the beams are visible light of red (r), green (g), and blue (b) to be three primary colors.

Figure 1:
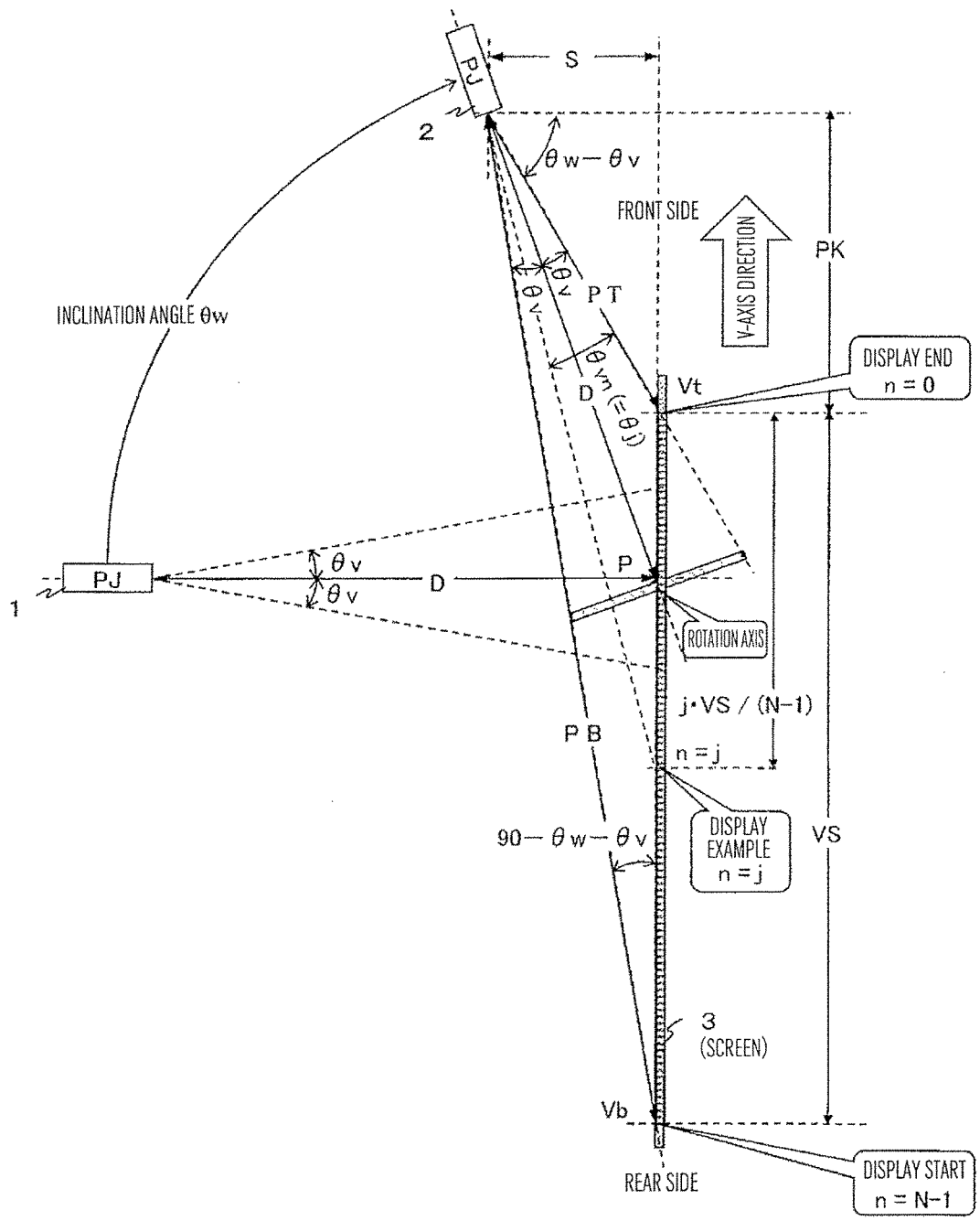
FIG. 1 is an arrangement diagram of a display device according to Embodiment 1.

FIG. 1 is an arrangement diagram of the display device according to the embodiments and illustrates an arrangement relation of display devices 1 and 2 and a screen 3. The display device 1 is in a state in which the display device projects video (hereinafter, referred to as orthographic projection) vertically from a position of a distance D (for example, 500 mm) with respect to a P point of the screen 3. The display device 2 is a state in which the display device 1 is inclined at an inclination angle $\theta\omega$ (for example, 70°) in the V-axis direction shown by an arrow in the drawing based on the P point and projects video. Naturally, when the video is projected actually, any one of the display devices 1 and 2 may exist. The embodiments described below are effective for the case in which a display device is inclined and arranged with respect to the screen 3, like the display device 2.

Biaxial swinging mirrors 15 and 16 (not illustrated in FIG. 1 and illustrated in FIG. 2) swing in the V-axis direction and video is displayed when scanning is performed from a lower side (rear side) Vb to an upper side (front side) Vt. In addition, VS shows a V-axis display size of the V-axis side on the screen 3 and S shows a distance from the display device 2 to the screen 3. In this embodiment, S=171.0 mm, PT=342.0 mm, PB=984.8 mm, and VS=673.6 mm are defined.

As compared with the case in which the display device is arranged like the display device 1, in the case in which the display device is arranged like the display device 2, an installation space of the display device can be reduced by reducing the distance S. However, an image on the screen 3 is displayed as follows. That is, in the H-axis direction vertical to a plane of paper of FIG. 1, trapezoidal distortion where a display area is narrowed at the front side Vt of the screen 3 as compared with the rear side Vb occurs. In addition, irregularity of a scanning line density where line display becomes dense in the V-axis direction of the drawing occurs. In addition, the phenomenon of a diameter of a beam spot increasing in an incidence direction of the drawing occurs. The embodiments to resolve the above problems are described hereinafter.

Embodiment 1

First, an operation outline of the trapezoidal distortion connection in Embodiment 1 will be described with reference to FIGS. 2 and 3 in addition to FIG. 1 described above.

Figure 2:
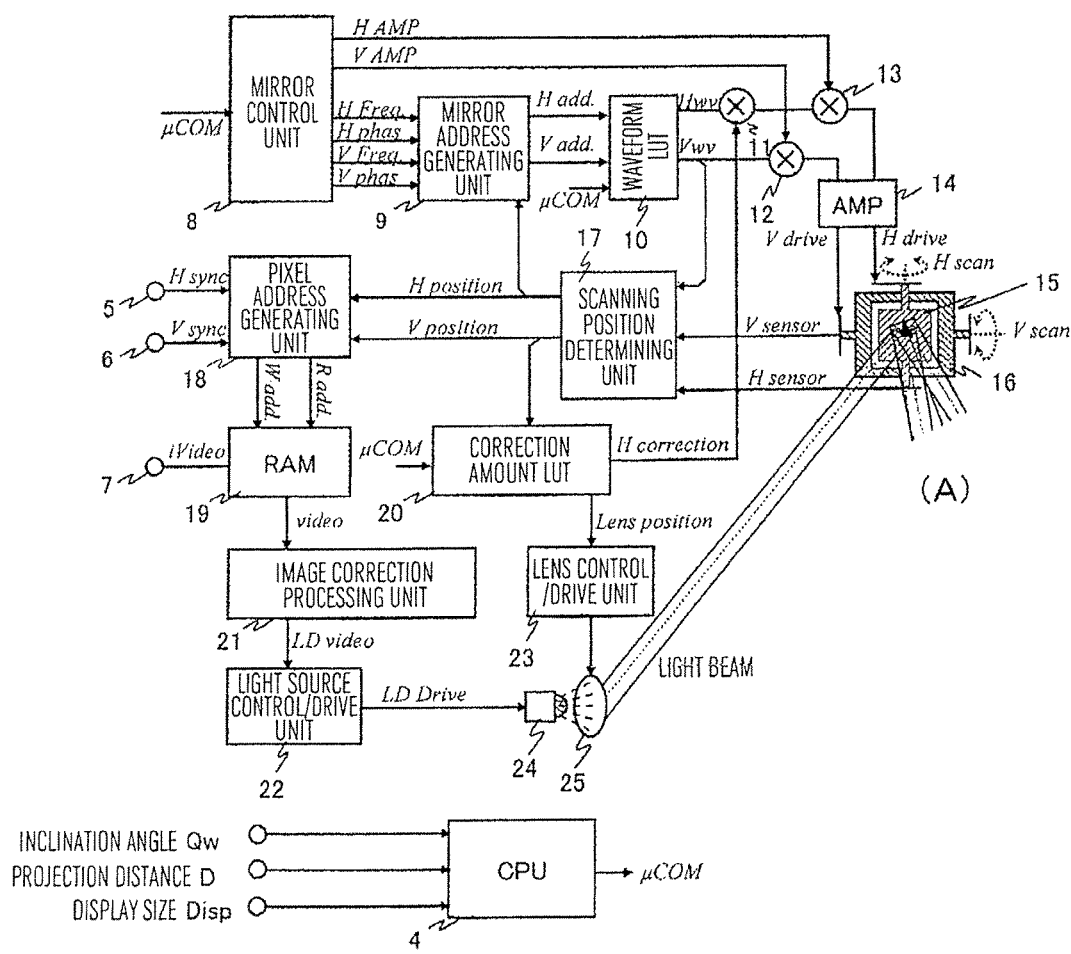
FIG. 2 is a block diagram of a display device according to Embodiment 1.

FIG. 2 is a block diagram of the display device according to Embodiment 1.

Figure 3:
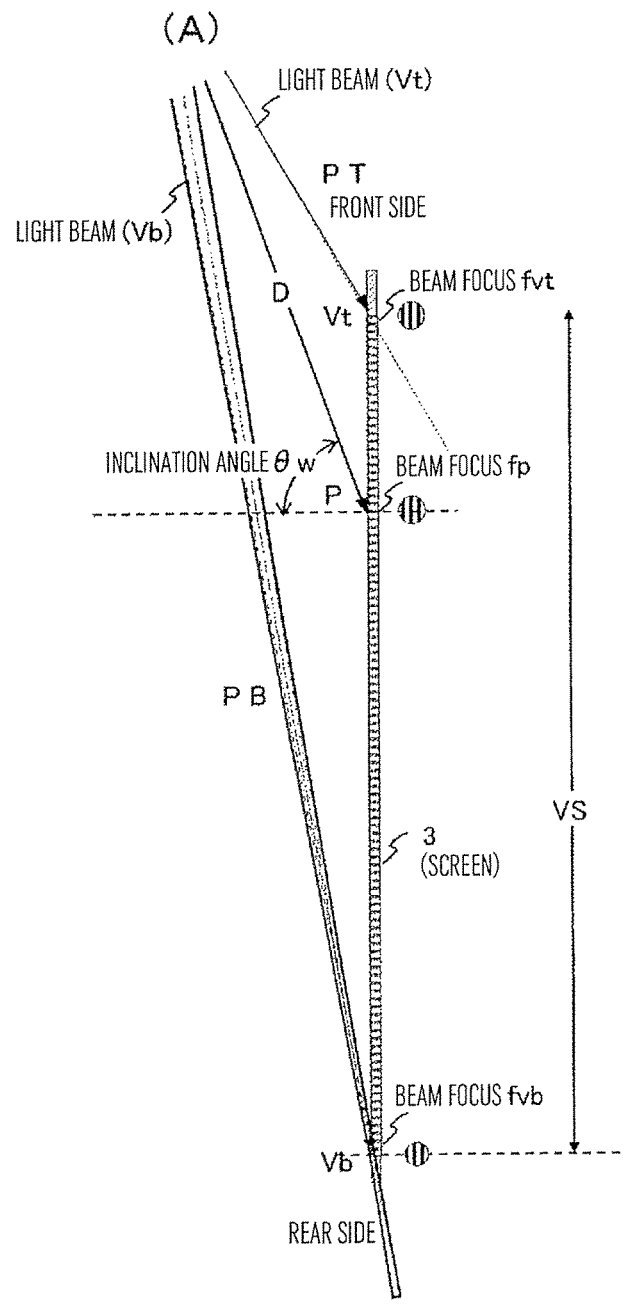
FIG. 3 is a diagram illustrating a portion around a screen according to Embodiments 1 to 5.
Figure 4:
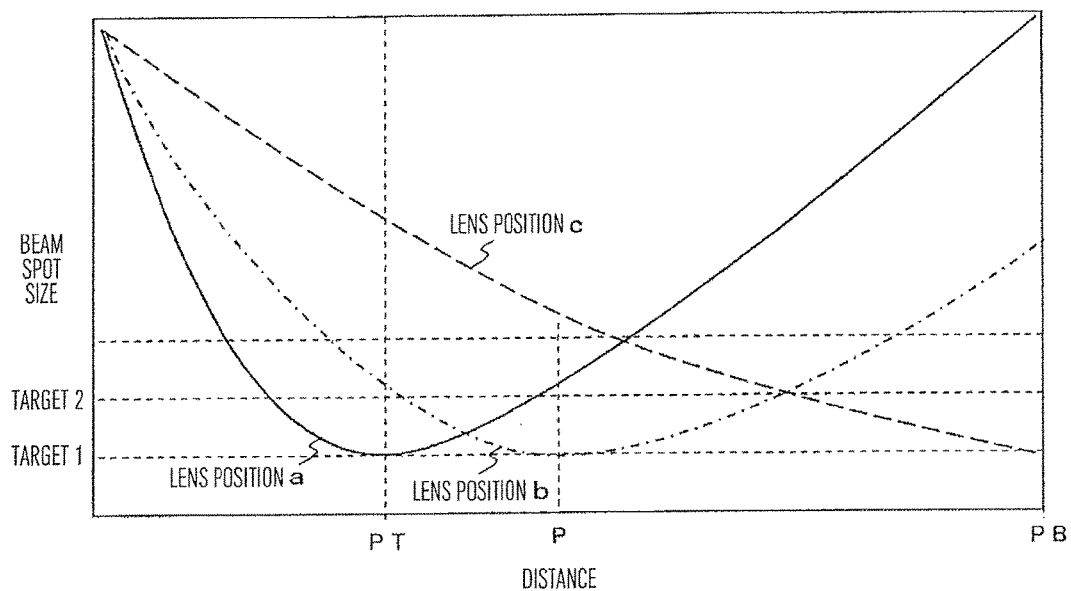
FIG. 4 is a diagram illustrating specifications of a condensing lens according to Embodiment 1.

FIG. 3 is a diagram illustrating a portion around the screen according to Embodiment 1. In FIGS. 2 and 3, components are connected in (A) and the components are originally illustrated integrally. However, the components are separated in the middle of an optical path to avoid complication of the drawings. In addition, FIG. 3 is used commonly in Embodiments 1 to 5.

A central processing unit (CPU) 4 of FIG. 2 is a control unit to control an operation of the device and sets control/drive conditions to a mirror control unit 8, generates table data stored in a waveform lookup table (LUT) 10 and a correction amount LUT 20, and stores the table data, to realize instructions of a user regarding an inclination angle $\theta\omega$, a projection distance D, and a display size Disp. A method of generating the table data will be described in detail later.

A mirror address generating unit 9 reads a drive waveform Hwy of the H-axis direction and a drive waveform Vwv of the V-axis direction from the waveform in LUT 10, based on an H-axis direction display cycle HFreq, a V-axis direction display cycle VFreq, H-axis direction phase information Hphas, and V-axis direction phase information Vphas supplied from the mirror control unit 8 and H-axis direction scanning position information Hposition of the mirror 15 supplied from a scanning position determining unit 17, supplies the former to a multiplier 11, and supplies the latter to a multiplier 12. In addition, values of drive waveforms Hwy and Vwv are read from the waveform LUT 10 in an address unit, based on an address Hadd of the H-axis direction and an address Vadd of the V-axis direction generated by the mirror address generating unit 9, and the drive waveforms are generated.

The correction amount LUT 20 acquires H-axis direction correction information Hcorrection for a V-axis direction scanning position from held table data, based on V-axis direction scanning position information Vposition of the mirror 16 supplied from the scanning position determining unit 17, and supplies it to the multiplier 11. The multiplier 11 multiplies Hwy and Hcorrection and supplies a result to a next multiplier 13. As a result, the trapezoidal distortion is corrected.

The multiplier 13 receives an amplification rate HAMP of the H-axis direction to realize the desired display size Disp from the mirror control unit 8 and multiplies it with a signal supplied from the previous multiplier 11. The multiplier 12 receives an amplification factor VAMP of the V-axis direction to realize the desired display size Disp from the mirror control unit 8 and multiplies it with Vwv. Then, the drive signal Hdrive of the H-axis direction converted into a voltage or a current by an AMP 14 drives the mirror 15 and the drive signal Vdrive of the V-axis direction drives the mirror 16.

The scanning position determining unit 17 determines the scanning position of the light beam due to the mirrors 15 and 16 from the drive waveform Vwv of the V-axis direction and mirror inclination information Hsensor/Vsensor supplied from the mirrors 15 and 16, supplies the H-axis direction scanning position information Hposition to the mirror address generating unit 9 and a pixel address generating unit 18, and supplies the V-axis direction scanning position information Vposition to the correction amount LUT 20 and the pixel address generating unit 18. Incidentally, the V-axis direction scanning position information Vposition can be generated using either one of Vwv and Vsensor described above. For example, when a large amount of noise is included in a signal of Vsensor, it may be generated using Vwv.

The pixel address generating unit 18 writes a video signal iVideo supplied from an input terminal 7 to a RAM 19, based on write address information Wadd generated with cycles Hsync/Vsync of the H-axis direction and the V-axis direction of input signals supplied from input terminals 5 and 6, and reads a video signal video from the RAM 19, based on address information Radd generated from the scanning position information Hposition/Vposition.

An image correction processing unit 21 generates a video signal LDvideo on which image processing such as brightness and color correction is executed and a light source control/drive unit 22 converts the video signal LDvideo into a voltage or current value and drives a laser light source 24. Laser light generated by the laser light source 24 is converted into a light beam by a condensing lens 25, is reflected by the swinging mirrors 15 and 16, and two-dimensionally scans the screen 3 illustrated in FIG. 3, thereby projecting and displaying video.

Figure 5A:
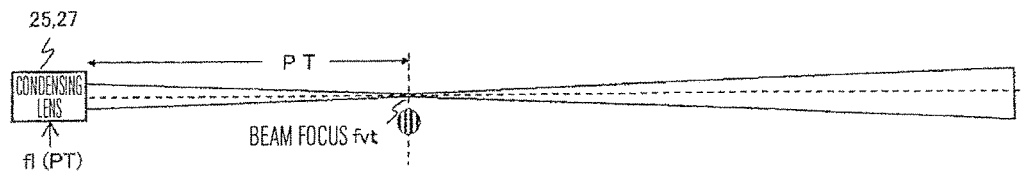
FIG. 5A is a first diagram illustrating an operation of the condensing lens according to Embodiment 1.
Figure 5B:
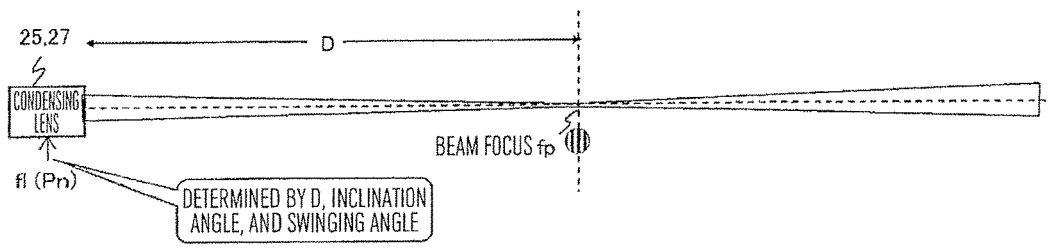
FIG. 5B is a second diagram illustrating an operation of the condensing lens according to Embodiment 1.
Figure 5C:
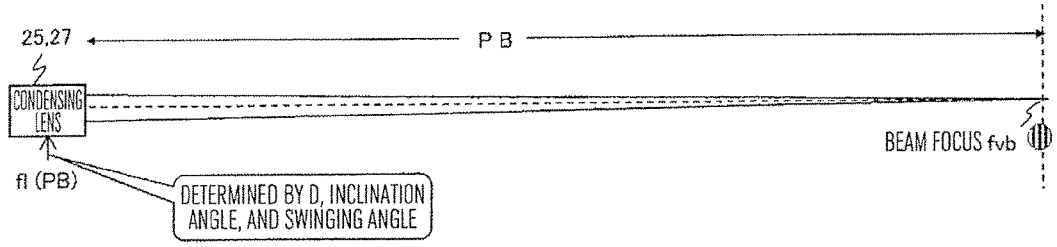
FIG. 5C is a third diagram illustrating an operation of the condensing lens according to Embodiment 1.

FIGS. 4 and 5A to 5C are schematic diagrams of a relation (beam waist) of the size of a beam spot and a distance, in particular FIGS. 5A to 5C are schematic diagrams of a cross-section of the beam spot, and the lens position Lensposition of the condensing lens 25 is exemplified with three points (lens positions a/b/c).

In FIGS. 5A to 5C, for example, PT/P(D)/PB points and the lens positions a/b/c are selected at the time of scanning and beam focuses become fvt/fp/fvb, that is, spot sizes are almost equalized or minimized on the screen. As a result, the phenomenon of the beam spot increasing in the incidence direction is resolved.

The correction amount LUT 20 previously calculates a projection position on the screen 3 by the CPU 4, based on the scanning position information Vposition of the V axis supplied from the scanning position determining unit 17, derives lens position information Lensposition using the projection position as the desired focus position from the relation of the beam west of FIGS. 4 and 5A to 5C, and holds the lens position information. In this case, precision of the lens position information Lensposition may be improved using the scanning position information Hposition of the H axis.

The correction amount LUT 20 obtains the lens position information Lensposition by referring to the scanning position information Vposition and adjusts the position of the condensing lens 25 by a lens control/drive unit 23. An adjustment method is to move the position of the condensing lens forward and backward in an optical path direction and may respond to minute adjustment of a piezoelectric element, electromagnetic drive, or the like which functions as a movable mechanism of the lens and a moderate 60 Hz-class cycle as a frequency of the drive signal Vdrive.

Next, a method of generating the waveform LUT 10 will be described using FIG. 1. First, it is assumed that, at the V-axis side of the mirrors 15 and 16, a relation of the voltage or current value of the drive signal Vdrive and the swinging angle is a proportional relation, the drive signal Hdrive is at 24.975 kHz, the drive signal Vdrive has a frequency of 60 Hz, and the drive signals are saw-tooth waves of a duty ratio of 8:2 in which a video display period DT is 80%.

The numbers of scanning lines N (666) of the video display period DT is determined from the following relation:

$$N=2 \cdot DT \cdot HFreq/VFreq. \qquad \text{(MATH. 1)}$$

A scanning line position n of the V axis and a swinging angle $\theta vn$ of the swinging mirror 16 of a micro electromechanical system (MEMS) are determined from the following relation:

$$\theta vn = \arctan\ [\tan(\theta\omega-\theta v)+(\tan(\theta\omega+\theta v)-\tan(\theta\omega-\theta v)) \cdot n / (N-1)] - \theta\omega+\theta v. \qquad \text{(MATH. 2)}$$

$\theta vn$ of FIG. 1 shows the time of n=j in a scanning range of n=0 to N−1.

As a result, the screen 3 is scanned at an equal interval without causing irregularity of the scanning line density of the V-axis direction, by the scanning line n=0 to N−1. According to control of the CPU 4, the waveform LUT 10 sets the address Vadd (showing order of scanning lines) of the V-axis direction as n and holds a value of the drive wave Vwv to realize an oscillation angle $\theta vn$ of the swinging mirror 16 of the MEMS.

Of course, N, n, and $\theta vn$ may be normalized in capacity order of the waveform LUT 10 and a value of the drive waveform Vwv may be held. In the multiplier 12 of the rear step, waveform amplitude may be adjusted by Vamp.

Figure 6A:
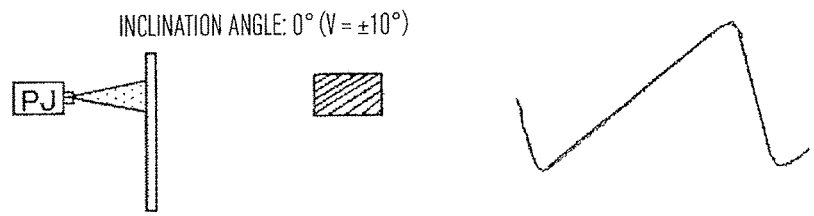
FIG. 6A is a first diagram illustrating an operation example according to Embodiment 1.
Figure 6B:
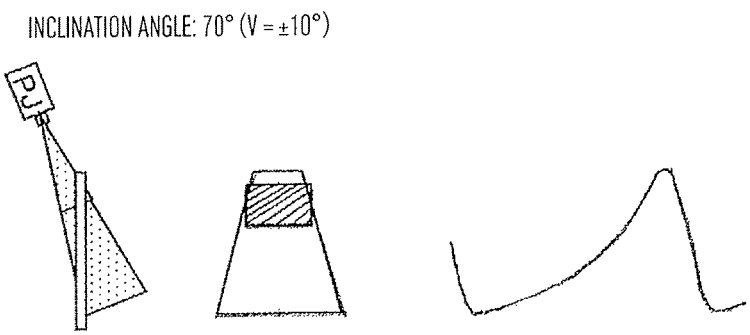
FIG. 6B is a second diagram illustrating an operation example according to Embodiment 1.
Figure 6C:
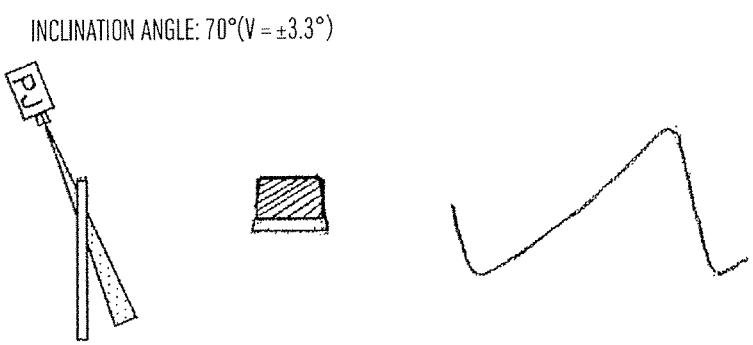
FIG. 6C is a third diagram illustrating an operation example according to Embodiment 1.

FIGS. 6A to 6C are first to third diagrams illustrating operation examples according to Embodiment 1.

FIG. 6A illustrates the state of the display device 1 in FIG. 1 and the swinging mirrors 15 and 16 are driven by a drive waveform of a saw-tooth wave of a duty ratio of 8:2, becoming a straight line in the display area. The drive waveform thereof is illustrated on a right end of FIG. 6A.

When the display device 2 in FIG. 1 is operated under the same drive condition, the trapezoidal distortion where the display area of the H-axis side (line display) decreases at the front side and the density of the scanning lines where the line display of the V-axis side becomes dense at the front side occur and an increase in the diameter of a condensed spot occurs in the V-axis direction. This is illustrated in FIGS. 6B and 6C. FIG. 6B illustrates the case of an inclination angle $\theta\omega=70°$ and $\theta v=10°$ and FIG. 6C illustrates the case of an inclination angle $\theta\omega=70°$ and $\theta v=3.3°$.

On right ends of FIGS. 6B and 6C, an example of the drive waveform Vwv in the case in which this embodiment is applied is illustrated. That is, it can be seen that the problem when the line display becomes dense as compared with the rear side can be resolved by increasing a drive speed of the V-axis direction toward the front side. As described above, the drive waveform Vwv is stored in the waveform LUT 10.

The drive waveform Hwy of the H-axis direction may be a waveform that realizes a resonance operation in the vicinity of a horizontal synchronous frequency and may be any waveform such as a sinusoidal wave, a rectangular wave, and a triangular wave.

Next, a method of generating an amplitude correction amount of the H-axis drive waveform in the correction amount LUT 20 will be described. In the case of the arrangement relation of FIG. 1, the trapezoidal distortion is in a relation in which the scanning line of the front side is short and the rear side is long, the correction amount LUT 20 supplies the H-axis direction correction information Hcorrection to the multiplier 11 and the trapezoidal distortion correction is realized, to narrow the amplitude of the scanning line of the rear side to be matched with the short scanning line Ht of the front side.

A size of the short scanning line Ht of the front side is represented by the following equation:

$$Ht=2D\cdot\cos\theta\omega/\cos(\theta\omega-\theta v)\cdot\tan\theta h. \quad \text{(MATH. 3)}$$

A swinging angle θhn of the H axis of the scanning line n and a horizontal size Hn are in the following relation:

$$Hn=2D\cdot\cos\theta\omega/\cos(\theta\omega-\theta v+\theta vn)\cdot\tan\theta hn, \quad \text{(MATH. 4)}$$

That is, an oscillation angle θhn may satisfy a relation of Hn=Ht:

$$\theta hn=\arctan\,[\cos(\theta\omega-\theta v+\theta vn)/\cos(\theta\omega-\theta v)\cdot\tan\theta h]. \quad \text{(MATH. 5)}$$

A distortion correction amount θhn/θh for the scanning position information Vposition (=n) is calculated by the CPU 4 and is held in the correction amount LUT 20.

The lens 25 may be controlled constantly, regardless of the inclination angle θω. In this case, the lens is controlled to have a focus at the rear side fvb. A trapezoidal correction amount is about 65% in FIG. 6B and is about 27% in FIG. 6C.

According to Embodiment 1, the V axis of the mirror is operated non-linearly such that a movement speed on the screen 3 is equalized and the drive waveform amplitude of the H axis is modulated. For this reason, the trapezoidal distortion is removed. In addition, light dispersion by an increase in the diameter of the line and a decrease in the brightness by reduction of a lighting time by the trapezoidal distortion correction can be suppressed.

The modulation of the drive waveform amplitude of the H axis performed with respect to the swinging mirror to remove the trapezoidal distortion is performed according to a low-speed scanning cycle of the V-axis direction, regardless of a high-speed scanning cycle of the H-axis direction. The phenomenon of the unevenness of the scanning line density occurring in the V-axis direction is resolved by modulating low-speed scanning of the V-axis direction. In addition, the phenomenon of the diameter of the beam spot increasing in the incidence direction is resolved, regardless of the drive of the swinging mirror. For this reason, even when the video is obliquely projected, an image quality can be maintained without rapidly changing the swinging speed of the mirror and an inclination angle of the oblique projection can be increased. In addition, a problem when specifications of other components become strict, instead of the swinging mirror, does not occur.

Embodiment 2

Figure 7:
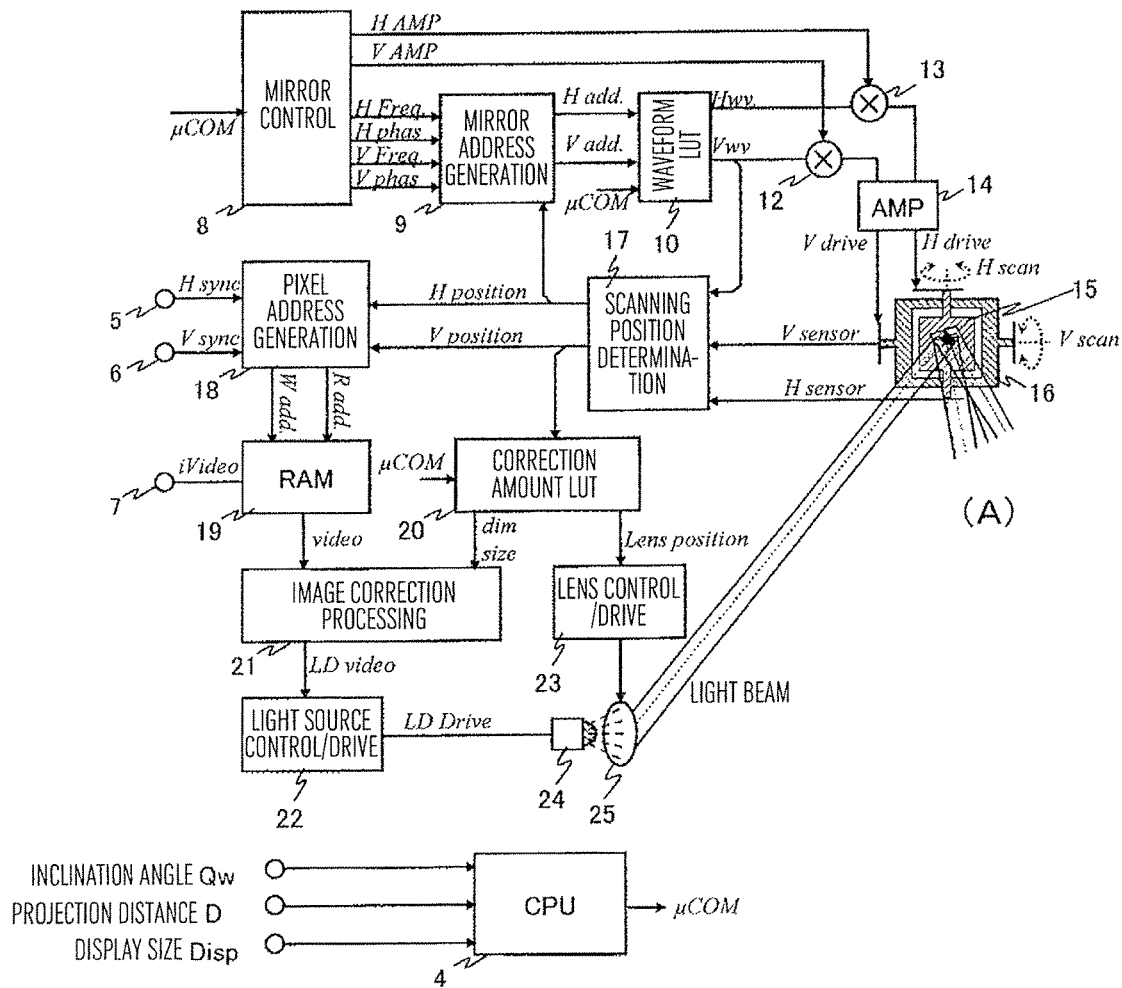
FIG. 7 is a block diagram of display devices according to Embodiments 2 and 3.

FIG. 7 is a block diagram of display devices according to Embodiments 2 and 3. Trapezoidal distortion correction according to Embodiment 2 will be described using FIG. 7. In the previous Embodiment 1, the trapezoidal distortion correction was performed by supplying H-axis direction correction information Hcorrection to the multiplier 11 by the correction amount LUT 20. That is, the trapezoidal distortion correction is performed by changing a scanning speed moderately. On the other hand, in Embodiment 2, the trapezoidal distortion correction is performed by correcting an image signal. Accordingly, it is not necessary to change the speed of the swinging mirror.

In Embodiment 2, the correction amount LUT 20 calculates a distortion correction amount θhn/θh for scanning position information Vposition (=n) as an image conversion rate size and supplies it to the image correction processing unit 21. In addition, the correction amount LUT 20 calculates brightness correction dim according to a value obtained by subtracting the scanning position information Vposition (=n) from the number of lines N and supplies it to the image correction processing unit 21.

The image correction processing unit 21 decreases the number of video pixels of an H-axis direction by the image conversion rate size, that is, performs scaling, generates LDvideo in an area using a scanning line center as a center, adjusts a brightness level of the LDvideo by the brightness correction dim, and supplies to a light source control/drive unit 22.

As a result, the trapezoidal distortion correction and the brightness correction are realized.

Resolution is sacrificed by the trapezoidal distortion correction according to this embodiment and brightness is sacrificed by reduction of a light emission time. However, the correction can be realized without depending on response performance of H axes of mirrors 15 and 16.

Embodiment 3

Trapezoidal distortion correction according to Embodiment 3 will be described using FIG. 7 again. An image correction processing unit 21 described in the previous Embodiment 2 scales the number of video pixels of an H-axis direction and performs trapezoidal distortion correction. On the other hand, in Embodiment 3, the trapezoidal distortion correction is performed by changing a clock rate.

In Embodiment 3, the image correction processing unit 21 changes a read clock rate of LDvideo by a reciprocal number of an image conversion rate size and generates the LDvideo in an area using a scanning line center as a center. Furthermore, similar to Embodiment 2, a brightness level of the LDvideo is adjusted according to the brightness correction dim supplied from the correction amount LUT 20.

As a result, the trapezoidal distortion correction and the brightness correction are realized.

Brightness is sacrificed by reduction of a light emission time the trapezoidal distortion correction according to this embodiment; however, different from Embodiment 2, resolution can be maintained.

Embodiment 4

Figure 8:
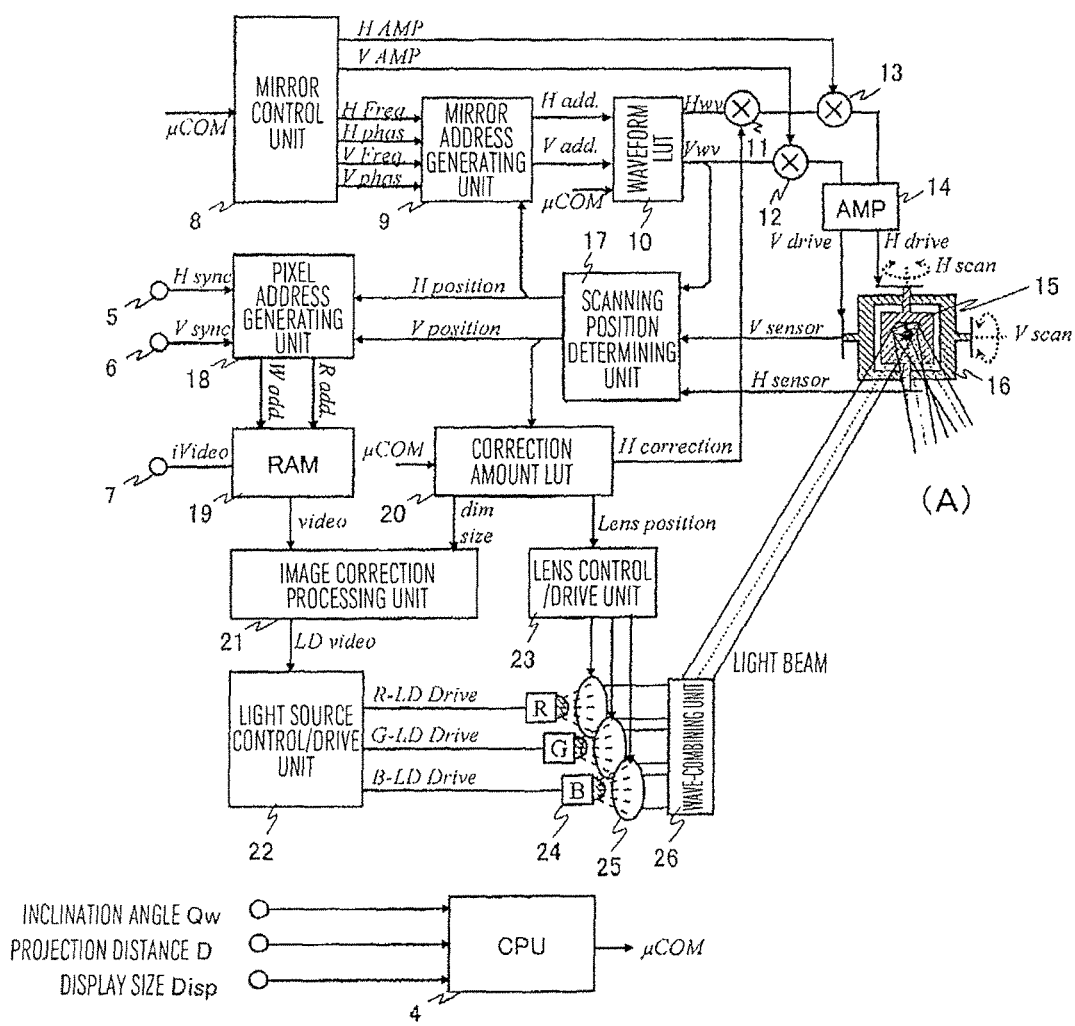
FIG. 8 is a block diagram of a display device according to Embodiment 4.

FIG. 8 is a block diagram of a display device according to Embodiment 4 and a laser light source 24 includes three primary colors of red (R)/green (G)/blue (B) and each movable condensing lens 25 is adjusted by the same method as an operation described in Embodiment 1. A wave-combining unit 26 condenses each optical path on the same axis.

In this case, the correction amount LUT 20 may have a correction amount for each of R/G/B and adjusts the movable condensing lens to have a focus at a desired position.

According to Embodiment 4, video display by R/G/B is enabled.

Embodiment 5

Figure 9:
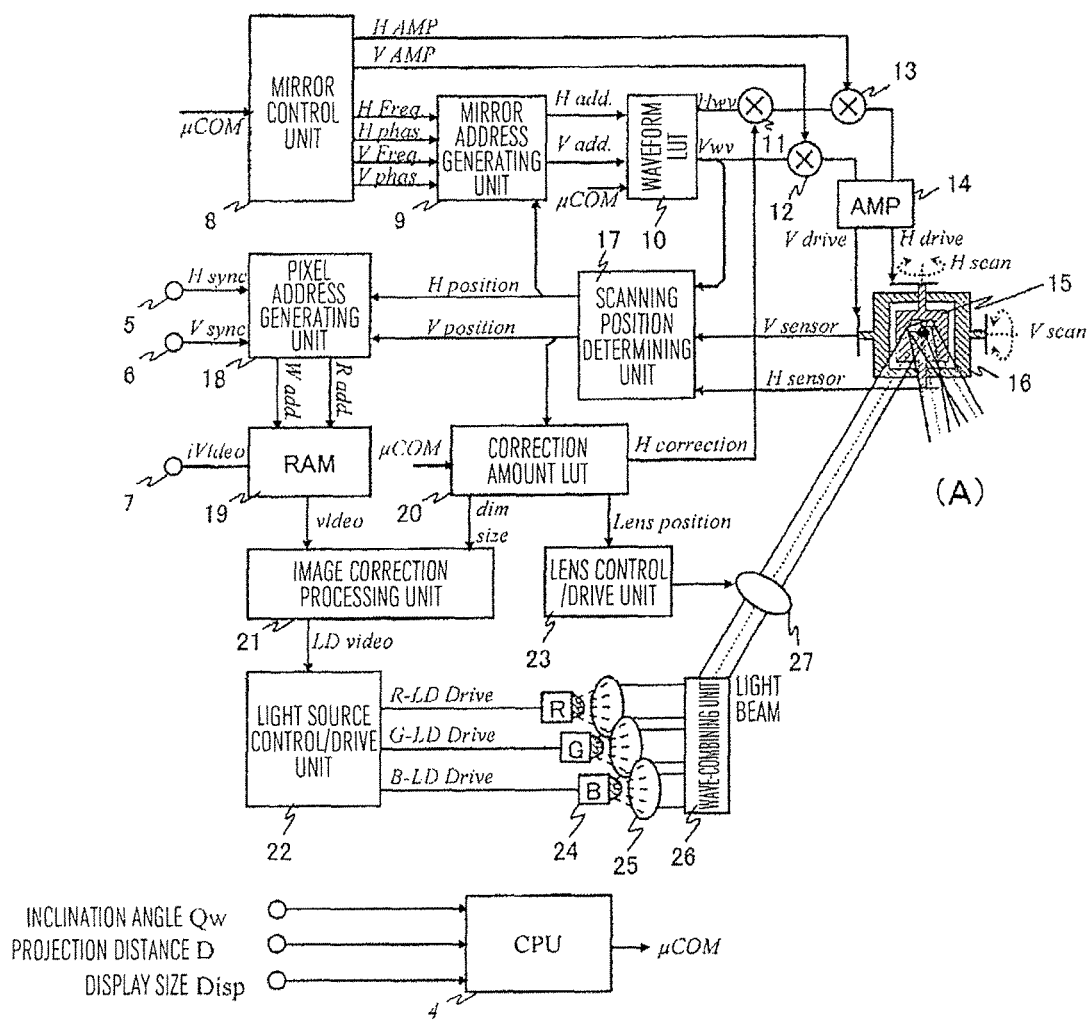
FIG. 9 is a block diagram of a display device according to Embodiment 5.

FIG. 9 is a block diagram of a display device according to Embodiment 5 and a laser light source 24 includes three primary colors of red (R)/green (G)/blue (B), similar to Embodiment 4; however, a condensing lens 25 is fixed, different from Embodiment 4. In addition, a second condensing lens 27 is arranged on an optical axis of a light beam after combining waves and a lens position thereof is adjusted by the lens control/drive unit 23, similar to Embodiment 1.

According to Embodiment 5, a lens adjustment mechanism can be reduced.

[Explanation of Items Common to Embodiments 1 to 5]

In the embodiments described above, a method of designating the inclination angle $\theta\omega$ and the projection distance D supplied to the CPU 4 is not mentioned. However, the inclination angle and the projection distance may be designated by a button operation and an inclination sensor and a distance sensor may be used.

In addition, the condensing lenses 25 and 27 are not limited to lenses made of glass or plastic and may be liquid lenses that can control a focal distance.

In addition, the beam diameter changing optical element that can change a focal distance illustrated in FIGS. 5A to 5C may change a beam diameter of the H-axis direction.

Even when arrangement conditions are restricted such as for head up display (HUD), head mounted display (HMD), and amusement, a degree of freedom of the arrangement of the display device can be improved by the configuration illustrated in the embodiments.

According to the embodiments, the axis of the low-speed side of the mirror (axis of the V-axis direction) is operated non-linearly such that the movement speed on the screen is equalized. The resolution is converted by the image processing, the pixel clock is modulated, and the display area is increased/decreased or the drive amplitude of the mirror is increased/decreased and the display area is changed. Alternatively, beams of light of laser light are bundled by the lens control/drive unit and the lens is adjusted to have the focus at the predetermined position. Specifically, the position of the condensing lens moves in a direction of the optical path and the display device is operated such that the spot size is substantially equalized or minimized in the display area on the screen.

As a result, when the video is projected onto the screen at the desired inclination angle, in the embodiments, the uniformity of the trapezoidal distortion and the pixel density is maintained and the display device is operated such that the spot size is substantially equalized or minimized in the display area on the screen, thereby providing technology for reducing an influence of the image quality degradation by expansion of the beam spot. As a result, a display device in which a degree of freedom of the arrangement can be improved, that is, a use form can be extended can be provided.

The mechanisms mentioned above are limited. However, the present invention is not limited thereto and the configuration and the drive method of the mirror, the lens adjustment method, the operation method of the operator, or the correction amount LUT may be determined according to an applied device and a use.

REFERENCE SIGNS LIST 1, 2: display device
3: screen
4: CPU
5, 6, 7: input terminal
8: mirror control unit
9: mirror address generation unit
10: waveform LUT
11, 12, 13: multiplier
14: AMP
15, 16: biaxial mirror
17: scanning position determining unit
18: pixel address generating unit
19: RAM
20: correction amount LUT
21: image correction processing unit
22: light source control/drive unit
23: lens control/drive unit
24: laser light source
25: condensing lens
26: wave-combining unit
27: second condensing lens

The invention claimed is:

1. A display device for emitting and scanning laser light modulated by an input video signal in a vertical direction and a horizontal direction of an image on which the video signal is based and displaying the image on a projection surface, the display device comprising:
a laser light source which generates the laser light;
a light source control/drive unit which causes the laser light source to generate laser light based on the video signal;
a condensing lens which condenses the laser light generated by the laser light source on the projection surface;
a lens control/drive unit which drives the condensing lens and adjusts a position of the condensing lens;
a swinging mirror on which the laser light passing through the condensing lens is incident and which reflects the laser light while scanning in the vertical direction and the horizontal direction of the image and emits to the projection surface;
a scanning position determining unit which determines a scanning position of the vertical direction and the horizontal direction of the swinging mirror;
a control unit which controls an operation of the display device based on information including an inclination angle, a projection distance, and a display size with respect to the projection surface of the display device;
a waveform LUT which stores scanning waveforms of the vertical direction and the horizontal direction of the swinging mirror, which are calculated by the control unit based on the information;
a correction amount LUT which stores a correction amount relating to a component of the display device according to the scanning position of the swinging mirror, which are calculated by the control unit based on the information;
a multiplier which multiplies the scanning waveform of the horizontal direction read from the waveform LUT and the correction amount of the scanning waveform of the horizontal direction according to the scanning position of the vertical direction of the swinging mirror read from the correction amount LUT, and supplies to the swinging mirror,
wherein the control unit renders a constant spot size of the laser light regardless of the position in the projection surface by:
controlling the swinging mirror based on the scanning waveform of the horizontal direction read from the LUT such that a scanning line density of the vertical direction of the projection surface is equalized,
controlling the lens control/drive unit to position the condensing lens based on the correction amount such that the condensing lens has a focus on the projection surface according to the scanning position of the vertical direction of the swinging mirror determined by the scanning position determining unit, and
controlling the swinging mirror based on the inclination angle, the projection distance, and the display size with respect to the projection surface such that a display size of the horizontal direction of the image displayed on the projection surface is equalized.

2. The display device according to claim 1, further comprising an image correction processing unit to which the video signal input to the display device is supplied and which reduces a number of pixels of the horizontal direction according to the correction amount read from the correction amount LUT and supplies to the light source control/drive unit,
wherein the control unit controls the image correction processing unit such that the display size of the horizontal direction of the image displayed on the projection surface is equalized, regardless of the scanning position of the vertical direction.

3. The display device according to claim 2, further comprising a storage unit which stores the input video signal,
wherein the number of pixels of the horizontal direction is reduced by changing a clock rate of a read clock according to the correction amount when the video signal is read from the storage unit.

4. The display device according to claim 1,
wherein the laser light source comprises at least laser light sources of three primary colors of red (R), green (G), and blue (B) and a plurality of condensing lenses are provided according to the at least laser light sources of three primary colors as for the condensing lens, and
wherein the control unit controls the lens control/drive unit such that the plurality of condensing lenses have a focus on the projection surface according to the scanning position of the vertical direction of the swinging mirror.

5. The display device according to claim 1,
wherein the laser light source comprises at least laser light sources of three primary colors of red (R), green (G), and blue (B) and a plurality of condensing lenses are provided according to the at least laser light sources of three primary colors as for the condensing lens,
wherein the display device further comprises: a combiner which aligns optical paths of laser light of the three primary colors passing through the plurality of condensing lenses on an identical optical axis; and a second condensing lens which condenses the laser light of the three primary colors passing through the combiner on the projection surface, and
wherein the control unit controls the lens control/drive unit such that the second condensing lens has a focus on the projection surface according to the scanning position of the vertical direction of the swinging mirror.

6. A display device for emitting and scanning laser light modulated by an input video signal in a vertical direction and a horizontal direction of an image on which the video signal is based and displaying the image on a projection surface, the display device comprising:
a laser light source which generates the laser light;
a light source control/drive unit which causes the laser light source to generate laser light based on the video signal;
a condensing lens which condenses the laser light generated by the laser light source on the projection surface;
a lens control/drive unit which drives the condensing lens and adjusts a position of the condensing lens;
a swinging mirror on which the laser light passing through the condensing lens is incident and which reflects the laser light while scanning in the vertical direction and the horizontal direction of the image and emits to the projection surface;
a scanning position determining unit which determines a scanning position of the vertical direction and the horizontal direction of the swinging mirror;
a control unit which controls an operation of the display device based on information including an inclination angle, a projection distance, and a display size with respect to the projection surface of the display device;
a waveform LUT which stores scanning waveforms of the vertical direction and the horizontal direction of the swinging mirror, which are calculated by the control unit based on the information;
a correction amount LUT which stores a correction amount relating to a component of the display device according to the scanning position of the swinging mirror, which are calculated by the control unit based on the information; and
an image correction processing unit to which the video signal input to the display device is supplied and which reduces a number of pixels of the horizontal direction according to the correction amount from the correction amount LUT and supplies to the light source control/drive unit,
wherein the control unit renders a constant spot size of the laser light regardless of the position in the projection surface by:
controlling the swinging mirror based on the scanning waveform of the horizontal direction from the LUT such that a scanning line density of the vertical direction of the projection surface is equalized,
controlling the lens control/drive unit to position the condensing lens based on the correction amount such that the condensing lens has a focus on the projection surface according to the scanning position of the vertical direction of the swinging mirror determined by the scanning position determining unit, according to supplied information including the inclination angle, the projection distance, and the display size with respect to the projection surface, and
controlling the image correction processing unit such that a display size of the horizontal direction of the image displayed on the projection surface is equalized, regardless of the scanning position of the vertical direction.

7. The display device according to claim 6, further comprising a multiplier which multiplies the scanning waveform of the horizontal direction from the waveform LUT and the correction amount of the scanning waveform of the horizontal direction according to the scanning position of the vertical direction of the swinging mirror from the correction amount LUT, and supplies to the swinging mirror,
 wherein the control unit controls the swinging mirror such that the display size of the horizontal direction of the image on the projection surface is equalized, regardless of the scanning position of the vertical direction.

8. The display device according to claim 6, further comprising a storage unit which stores the input video signal,
 wherein the number of pixels of the horizontal direction is reduced by changing a clock rate of a read clock according to the correction amount when the video signal is read from the storage unit.

9. The display device according to claim 6,
 wherein the laser light source comprises at least laser light sources of three primary colors of red (R), green (G), and blue (B) and a plurality of condensing lenses are provided according to the at least laser light sources of three primary colors as for the condensing lens, and
 wherein the control unit controls the lens control/drive unit such that the plurality of condensing lenses have a focus on the projection surface according to the scanning position of the vertical direction of the swinging mirror.

10. The display device according to claim 6,
 wherein the laser light source comprises at least laser light sources of three primary colors of red (R), green (G), and blue (B) and a plurality of condensing lenses are provided according to the at least laser light sources of three primary colors as for the condensing lens,
 wherein the display device further comprises: a combiner which aligns optical paths of laser light of the three primary colors passing through the plurality of condensing lenses on an identical optical axis; and a second condensing lens which condenses the laser light of the three primary colors passing through the combiner on the projection surface, and
 wherein the control unit controls the lens control/drive unit such that the second condensing lens has a focus on the projection surface according to the scanning position of the vertical direction of the swinging mirror.

11. The display device according to claim 6,
 wherein the correction amount LUT calculates a distortion correction amount $\theta hn/\theta h$ for scanning position information Vposition (=n) as an image conversion rate size and calculates brightness correction dim according to a value obtained by subtracting the scanning position Vposition (=n) from a number of lines N,
 wherein the image correction processing unit decreases a number of video pixels of an H-axis direction by a number corresponding to the image conversion rate size to generate LDvideo in an area using a scanning line center as a center, and adjusts a brightness level of the LDvideo by the brightness correction dim to supply to the light source control/drive unit.

12. The display device according to claim 1,
 wherein the correction amount LUT calculates a distortion correction amount $\theta hn/\theta h$ for scanning position information Vposition (=n) as an image conversion rate size and calculates brightness correction dim according to a value obtained by subtracting the scanning position Vposition (=n) from a number of lines N,
 wherein the correction amount LUT decreases a number of video pixels of an H-axis direction by a number corresponding to the image conversion rate size to generate LDvideo in an area using a scanning line center as a center, and adjusts a brightness level of the LDvideo by the brightness correction dim to supply to the light source control/drive unit.

* * * * *